United States Patent
Yamato et al.

(10) Patent No.: US 10,166,936 B2
(45) Date of Patent: Jan. 1, 2019

(54) DAMPING MATERIAL

(71) Applicant: Nishikawa Rubber Co., Ltd., Hiroshima (JP)

(72) Inventors: Yuichi Yamato, Hiroshima (JP); Wataru Komura, Hiroshima (JP); Junji Nadano, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 302 days.

(21) Appl. No.: 15/299,829

(22) Filed: Oct. 21, 2016

(65) Prior Publication Data
US 2017/0113633 A1 Apr. 27, 2017

(30) Foreign Application Priority Data

Oct. 26, 2015 (JP) ................................. 2015-210190
Jul. 4, 2016 (JP) ................................. 2016-132879
Aug. 12, 2016 (JP) ................................. 2016-159003

(51) Int. Cl.
*B60R 13/02* (2006.01)
*B60R 13/08* (2006.01)

(52) U.S. Cl.
CPC ...... *B60R 13/0815* (2013.01); *B60R 13/0243* (2013.01)

(58) Field of Classification Search
CPC ..................... B60R 13/0815; B60R 13/0243
See application file for complete search history.

(56) References Cited

FOREIGN PATENT DOCUMENTS

| JP | 04-151043 A | 5/1992 |
| JP | 05-52237 A | 3/1993 |
| JP | 05-246244 A | 9/1993 |
| JP | 09-300962 A | 11/1997 |
| JP | 2005-351366 A | 12/2005 |
| JP | 2009-174161 A | 8/2009 |
| JP | 2009-174163 A | 8/2009 |

*Primary Examiner* — Michael C Miggins
(74) *Attorney, Agent, or Firm* — Mintz Levin Cohn Ferris Glovsky and Popeo, P.C.; David G. Conlin; Steven M. Jensen

(57) ABSTRACT

There is provided a damping material which is capable of yielding a damping effect by use of a simple configuration, and also allows for easy attachment and low cost. A vehicle damping material includes: a mass body containing section in which a hollow section is formed and in which a mass body is inserted into the hollow section; and a gripping section for pinching a vehicle member, the mass body containing section and the gripping section each being made of an elastic material.

15 Claims, 13 Drawing Sheets

DAMPING MATERIAL

This Nonprovisional application claims priority under 35 U.S.C. § 119 on Patent Applications Nos. 2015-210190 filed in Japan on Oct. 26, 2015, 2016-132879 filed in Japan on Jul. 4, 2016, and 2016-159003 filed in Japan on Aug. 12, 2016, the entire contents of which are hereby incorporated by reference.

TECHNICAL FIELD

The present invention relates to a damping material to be attached to vibration-suppression-target members. Examples of the vibration-suppression-target members encompass vehicle members such as doors of automobiles, and structures which include building materials such as ceiling joists in buildings.

BACKGROUND ART

Conventionally, various measures have been taken to reduce vibrations and impact sounds of doors of automobiles, a floor of a general residential house, and the like.

For example, Patent Literature 1 discloses a door structure of an automobile in which a door reinforcing member is supported in a floating manner by a door inner plate via an attachment member and an elastic body and thereby the door reinforcing member is used as a dynamic damper structure. Meanwhile, Patent Literature 2 discloses a sealing strip including: a hollow tubular sealing section which is made of a compressible material and includes a wire-form metal material along a longitudinal direction of the sealing section; and a groove-like gripping section which grips a frame around an opening of a door of an automobile or the like and supports the sealing section.

CITATION LIST

Patent Literature

[Patent Literature 1] Japanese Patent Application Publication Tokukaihei No. 5-246244 (Publication date: Sep. 24, 1993)
[Patent Literature 2] Japanese Patent Application Publication Tokukaihei No. 9-300962 (Publication date: Nov. 25, 1997)

SUMMARY OF INVENTION

Technical Problem

However, the door reinforcing member disclosed in Patent Literature 1 is configured on the premise that the door reinforcing member is attached to a base member between a door inner panel and a door outer panel of an automobile. Accordingly, the door reinforcing member cannot be attached to other member of the automobile. Further, the door reinforcing member is fixed to the base member with a bolt and a nut. This causes problems that labor is required for attachment and detachment of the door reinforcing member and that cost increases due to increase in the number of parts for the attachment.

Meanwhile, the sealing strip disclosed in Patent Literature 2 is a member for sealing an opening of, for example, a door of an automobile, so that a position to which the sealing strip is attached is limited to an opening which needs to be sealed. Therefore, the sealing strip is not configured on the premise that the sealing strip may be attached to a member, other than an opening, of an automobile or the like. Further, since the metal material is fixed inside the sealing section so as to be in contact with an inner wall of the sealing section. Accordingly, the sealing strip has a problem that the sealing strip cannot yield a sufficient damping effect, as compared to a configuration in which the metal material is fixed in a condition where a space is provided between the metal material and an inner wall of the sealing section and a configuration in which the metal material can freely move inside the sealing section.

An embodiment of the present invention is attained in view of the above problems. An object of an embodiment of the present invention is to provide a damping material which can yield a damping effect by use of a simple configuration and also can be attached at low cost to various vibration-suppression-target members by a simple operation.

Solution to Problem

In order to solve the above problems, a damping material in accordance with an embodiment of the present invention is a damping material to be attached to a vibration-suppression-target member, the damping material including: a mass body containing section in which a hollow section is formed for containing a mass body; and a gripping section for fixing the damping material to the vibration-suppression-target member by pinching the vibration-suppression-target member, the mass body containing section and the gripping section each being made of an elastic material, and the mass body being inserted into the hollow section.

In order to solve the above problems, a damping material in accordance with an embodiment of the present invention is a damping material to be attached to a vibration-suppression-target member, the damping material including: a plurality of mass body containing sections in which hollow sections are formed, respectively; and a gripping section for fixing the damping material to the vibration-suppression-target member by pinching the vibration-suppression-target member, the hollow sections being formed into shapes which allow mass bodies to be inserted into the hollow sections, respectively.

In order to solve the above problems, a damping material in accordance with an embodiment of the present invention is a damping material to be attached to a vibration-suppression-target member, the damping material including: a mass body containing section in which a hollow section is formed for containing a mass body; and a gripping section for fixing the damping material to the vibration-suppression-target member by pinching the vibration-suppression-target member, the gripping section being provided with a supporting section for elastically supporting the mass body containing section, the mass body being inserted into the hollow section, and either one of the supporting section and the mass body containing section being provided with a cut section.

Advantageous Effects of Invention

A damping material in accordance with an embodiment of the present invention, advantageously, can yield a damping effect by use of a simple configuration and also can be attached at low cost to various vibration-suppression-target members by a simple operation.

BRIEF DESCRIPTION OF DRAWINGS (a) of FIG. 1 is a perspective view schematically illustrating a state in which a vehicle damping material in accordance with an embodiment of the present invention is attached to a reinforcing frame. (b) of FIG. 1 is a cross sectional view schematically illustrating a structure of an automobile door to which the vehicle damping material in accordance with the embodiment of the present invention is attached.

FIG. 2 is a cross sectional view illustrating a vehicle damping material in accordance with an embodiment of the present invention, taken along a plane orthogonal to an X-axis.

(a) of FIG. 3 is a perspective view schematically illustrating a state in which a vehicle damping material in accordance with an embodiment of the present invention is attached to a vehicle member. (b) of FIG. 3 is a perspective view schematically illustrating a state in which a vehicle damping material in accordance with another embodiment of the present invention is attached to a reinforcing frame.

FIG. 4 is a cross sectional view illustrating a vehicle damping material in accordance with another embodiment of the present invention, taken along a plane orthogonal to an X-axis.

(a) of FIG. 5 is a diagram illustrating a test method of a damping effect which can be obtained in a case where a vehicle damping material in accordance with an embodiment of the present invention is attached to a reinforcing frame. (b) of FIG. 5 is a graph showing a result of testing in accordance with the above test method.

(a) of FIG. 6 is a cross sectional view illustrating a configuration of a damping material in accordance with another embodiment of the present invention, and (b) of FIG. 6 is a cross sectional view schematically illustrating a structure of an automobile door to which the damping material is attached.

(a) of FIG. 7 is a cross sectional view illustrating a configuration of Modified Example 1 of the damping material in accordance with the another embodiment of the present invention, and (b) of FIG. 7 is a cross sectional view illustrating a configuration of Modified Example 2 of the damping material in accordance with the another embodiment of the present invention.

(a) of FIG. 8 is a cross sectional view illustrating a configuration of Modified Example 3 of the damping material in accordance with the another embodiment of the present invention, and (b) of FIG. 8 is a perspective view illustrating a configuration of Modified Example 4 of the damping material in accordance with the another embodiment of the present invention.

FIG. 9 is a diagram illustrating a test method for confirming resonant frequencies of damping materials in accordance with embodiments of the present invention.

(a) to (d) of FIG. 10 are graphs showing respective resonance results of four types of damping materials in accordance with different embodiments.

DESCRIPTION OF EMBODIMENTS

<Example Attachment of Vehicle Damping Material>

Figure 1:
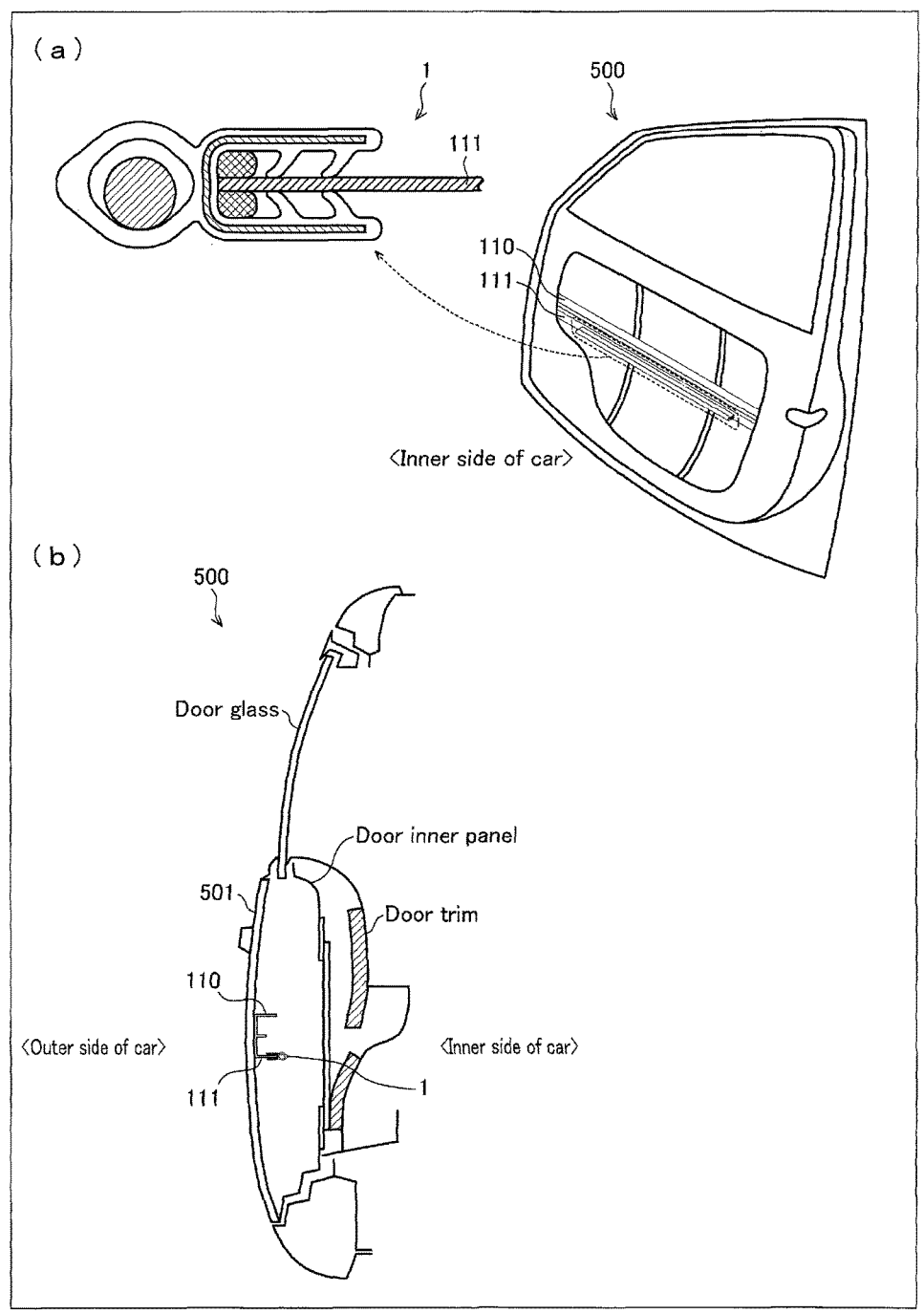

First, with reference to FIG. 1, the following discusses a structure of an automobile door 500 to which a vehicle damping material (damping material) 1 in accordance with one embodiment of the present invention is attached. The vehicle damping material 1 is attached, as illustrated in (a) and (b) of FIG. 1, to a reinforcing frame (vibration-suppression-target member) 110 which is provided on a door outer panel 501 of the automobile door 500, so as to reduce vibrations and impact sounds of the automobile door 500. Specifically, the vehicle damping material 1 is attached, as illustrated in (b) of FIG. 1, to a protruding portion 111 provided at the lowest position in a vertical direction among three protruding portions of the reinforcing frame 110. Note that the vehicle damping material 1 may be attached to either one of two protruding portions other than the protruding portion 111. Further, an aspect, illustrated in FIG. 1, in which the vehicle damping material 1 is attached is merely one example. The vehicle damping material 1 can be attached to protruding portions or the like of various vehicle members, other than the reinforcing frame 110, which constitute an automobile (not illustrated).

<Structure of Vehicle Damping Material>

Figure 2:
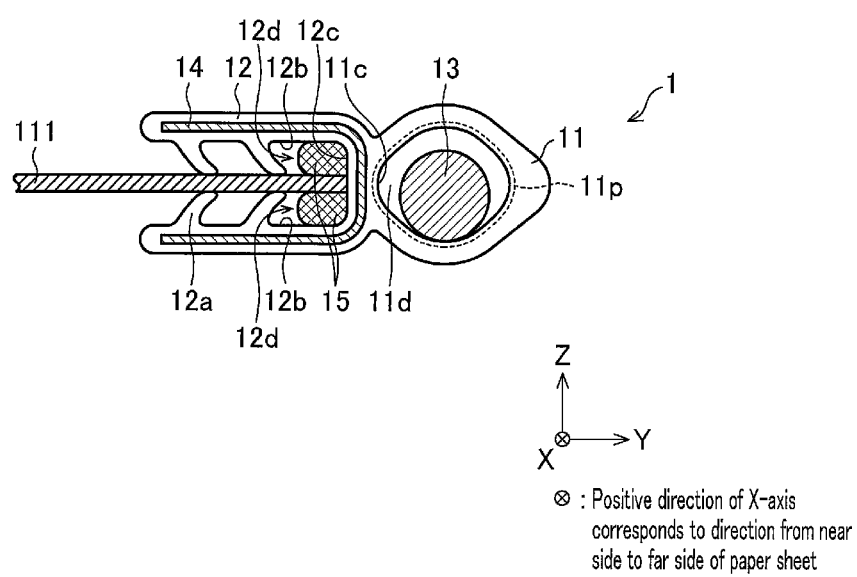

Next, with reference to FIG. 2, the following discusses a structure of the vehicle damping material 1 in accordance with one embodiment of the present invention. As illustrated in FIG. 2, the vehicle damping material 1 includes a mass body containing section 11 and a gripping section 12 which are each made of an elastic material, a columnar iron core (mass body) 13, and a core member 14. Further, the mass body containing section 11 and the gripping section 12 are formed in a continuous manner.

The mass body containing section 11 has a substantially rhombus-shape cross section, taken along a plane orthogonal to an X-axis in FIG. 2. The mass body containing section 11 has a hollow section 11p which is formed for containing the iron core 13. The hollow section 11p has a substantially ellipse-shape cross section, taken along a plane orthogonal to the X-axis in FIG. 2. The iron core 13 is inserted in the hollow section 11p, so that the mass body containing section 11 contains the iron core 13.

Note that the shape of the cross section of the mass body containing section 11 is not limited to a substantially rhombus shape, but can be any of various shapes such as a circular shape, and a square shape. Further, the shape of the cross section of the hollow section 11p is also not limited to a substantially ellipse shape. The shape of the cross section of the hollow section 11p only needs to be a shape which is arranged, in accordance with a shape and a size of a cross section of the iron core 13 taken along a plane orthogonal to the X-axis in FIG. 2, so as to allow the mass body containing section 11 to contain the iron core 13.

Further, as illustrated in FIG. 2, in a state where the iron core 13 is inserted in the hollow section 11p, the hollow section 11p includes a space 11d which is formed between an inner wall surface 11c and the iron core 13. Accordingly, in the mass body containing section 11, a portion substantially opposed to the gripping section 12 and a portion which forms the space 11d function to absorb vibrations in a case where the automobile door 500 vibrates.

The gripping section 12 fixes, as illustrated in FIG. 2, the vehicle damping material 1 to the reinforcing frame 110 by pinching the protruding portion 111 of the reinforcing frame 110. Further, the gripping section 12 is provided with projections 12a for fixing the vehicle damping material 1 to the reinforcing frame 110. The projections 12a are provided such that two projections 12a (four projections in total) project substantially along the X-axis in FIG. 2 from each of two inner surfaces 12b which are opposed to each other in the gripping section 12.

Furthermore, the gripping section 12 is provided with a pinching space 12d which is formed by the two inner surfaces 12b and an inner side surface 12c of the gripping section 12. The inner side surface 12c is substantially orthogonal to (intersects with) the two inner surfaces 12b. This pinching space 12d is filled with a sealant 15 such that the sealant 15 is in contact with the inner side surfaces 12c. The protruding portion 111 is inserted into this sealant 15, so that the vehicle damping material 1 is more firmly fixed to the reinforcing frame 110. The sealant 15 may be a polyisobutylene-based sealant. Note that an aspect in which the sealant 15 is filled is not limited to the case as described above. For example, the sealant 15 may be provided so as to fill the pinching space 12d in such a manner that the sealant 15 is held only by the two inner surfaces 12b and is not in contact with the inner side surface 12c (not illustrated). Further, the sealant 15 is merely a member for strengthening fixing force of the gripping section 12. Therefore, the sealant 15 is not an essential element in the vehicle damping material 1.

Note that the number, the shape, positions, etc. of the projections 12a can be arbitrarily designed in accordance with, for example, a thickness of the protruding portion 111 of the reinforcing frame 110, or in a case where the damping material 1 is to be attached to a vehicle member other than the reinforcing frame 110, in accordance with the shape, the size, etc. of the vehicle member to which the vehicle damping material 1 is to be attached. For example, though not illustrated in the drawings, the projections 12a may be arranged to project from only one of the two inner surfaces 12b of the gripping section 12, or each of the two inner surfaces 12b may be provided with three or more projections 12a. Further, an angle which the projections 12a each make with the inner surface 12b can be designed as appropriate in consideration of easy attachment, more reliable fixation, and the like.

Alternatively, in a case where the gripping section 12 is arranged to have a shape in which a distance between the two inner surfaces 12b is substantially equal to a thickness of the protruding portion 111, the vehicle damping material 1 can be fixed to the reinforcing frame 110 without provision of the projections 12a. Therefore, it is not essential to provide the projections 12a in the gripping section 12.

All of the mass body containing section 11, the gripping section 12, and the projections 12a are made of an identical elastic material. Examples of such an elastic material used for formation of the above sections and projections encompass various rubber materials each containing, as a main component, ethylene-propylene-diene rubber (EPDM), natural rubber or chloroprene rubber (CR), various thermoplastic elastomers, urethane, and polyvinyl chloride (PVC).

Note that a material of the mass body containing section 11 is not necessarily the same as a material of the gripping section 12, and the mass body containing section 11 and the gripping section 12 can be made of different materials. Further, a material of the projections 12a is not necessarily the same as a material of the gripping section 12, and the projections 12a and the gripping section 12 can be made of different materials. In other words, the projections 12a only need to be made of an elastic material that more reliably fixes the vehicle damping material 1 to the reinforcing frame 110.

The iron core 13 is a mass body, which absorbs vibrations of the automobile door 500 and vibrates itself. Note that the mass body may be, for example, a mass body made of metal except for iron, other than the iron core 13. Further, the shape of the iron core 13 is not limited to a columnar shape, but may be, for example, a prism shape including a rectangular parallelepiped shape. Further, in a case where, for example, the hollow section 11p is arranged to have a configuration in which openings at respective ends of the hollow section 11p are each blocked by an openable member such as a cap, a configuration in which the iron core 13 is in contact with the inner wall surface 11c of the hollow section 11p, or the like configuration, the iron core 13 having any of various masses can be inserted into the hollow section 11p. It is possible to reduce vibrations of the automobile door 500 at various frequencies, by changing the mass of the iron core 13 as described above.

The core member 14 is a member which is embedded in the gripping section 12 so as to increase rigidity of the gripping section 12 and improve fixing force of the gripping section 12. The core member 14 has a substantially U-shaped cross section, taken along a plane orthogonal to the X-axis in FIG. 2. This substantially U-shaped cross section of the core member 14 is identical in shape to a cross section of the gripping section 12. Further, the core member 14 is made of a material which increases the rigidity of the gripping section 12. Examples of such a material encompass various metals including iron, and hard resins.

Note that a thickness of the core member 14 may be arbitrarily designed in accordance with fixing force of the gripping section 12, cost, a weight of the vehicle damping material 1, and the like which a user requires. Further, the core member 14 is merely a member for strengthening the fixing force of the gripping section 12. Therefore, the core member 14 is not an essential constituent element in the vehicle damping material 1.

Next, with reference to FIG. 3, the following discusses points to be considered in setting a length of the vehicle damping material 1 in the X-axis direction in FIG. 2 (hereinafter, simply referred to as "length").

Figure 3:
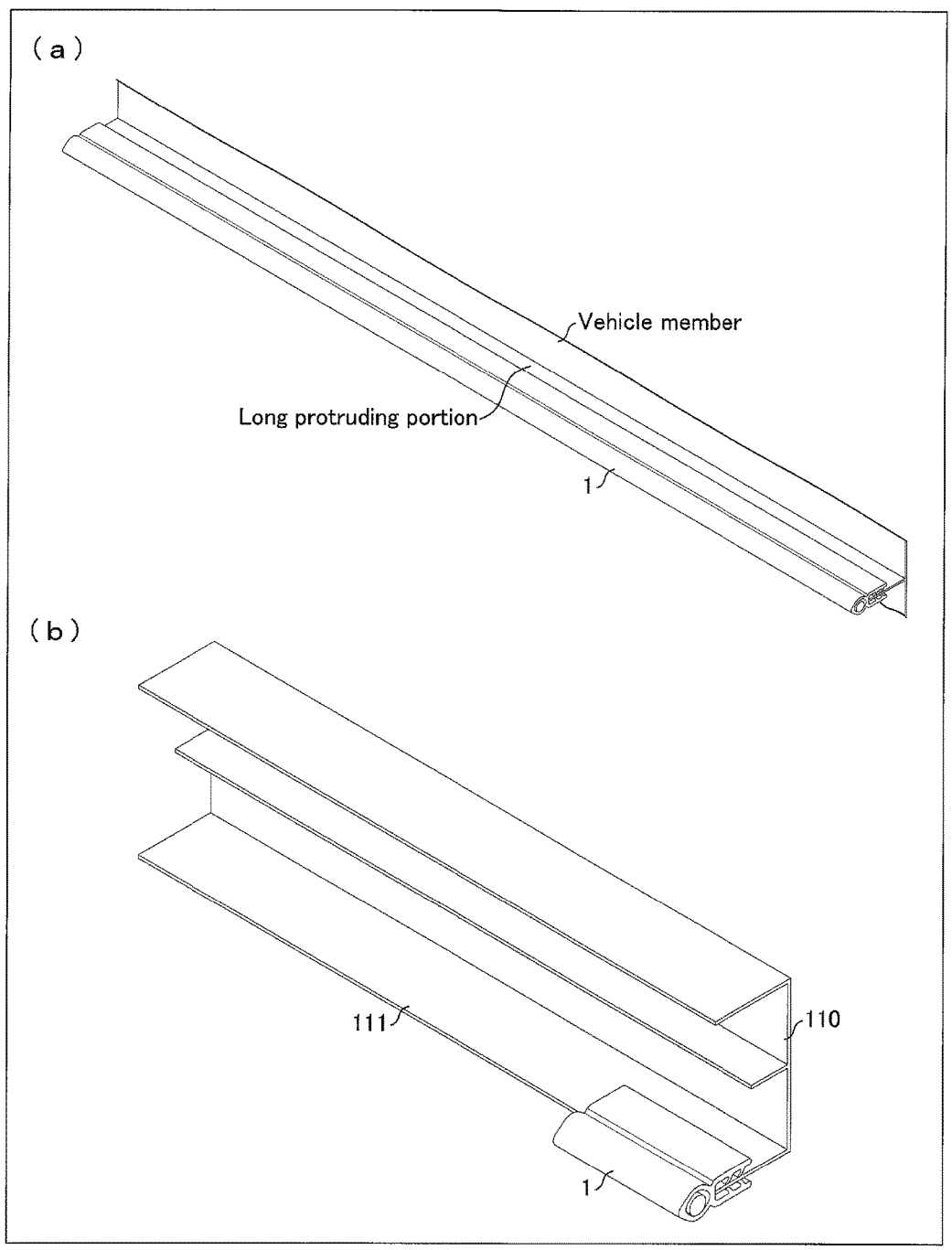

In a case where the vehicle damping material 1 produced is a long vehicle damping material, as illustrated in (a) of FIG. 3, which can be attached to a long protruding portion of a vehicle member all along the long protruding portion, vibrations of the automobile door 500 are absorbed by the iron core 13 at a higher absorbance. This makes it possible to obtain a high damping effect. Meanwhile, in a case where the vehicle damping material 1 produced is a short vehicle damping material, as illustrated in (b) of FIG. 3, which can be attached to a part of the protruding portion 111 of the reinforcing frame 110, a user can easily hold the vehicle damping material 1 with user's hands because the vehicle damping material 1 is short. This makes it possible to easily attach and detach the vehicle damping material 1.

Accordingly, vehicle damping materials 1 having various lengths in the X-axis direction can be produced, so that a vehicle damping material 1 of an appropriate length can be attached to a vehicle member in accordance with a length of the vehicle member, such as the reinforcing frame 110, to which the vehicle damping material 1 is to be attached, and in consideration of respective advantages of a case where the vehicle damping material 1 is arranged to be long and a case where the vehicle damping material 1 is arranged to be short.

There are various possible variations as vehicle damping materials in accordance with embodiments of the present invention, in addition to the above-described embodiment of the vehicle damping material 1. The following discusses such variations, with reference to FIG. 4.

Figure 4:
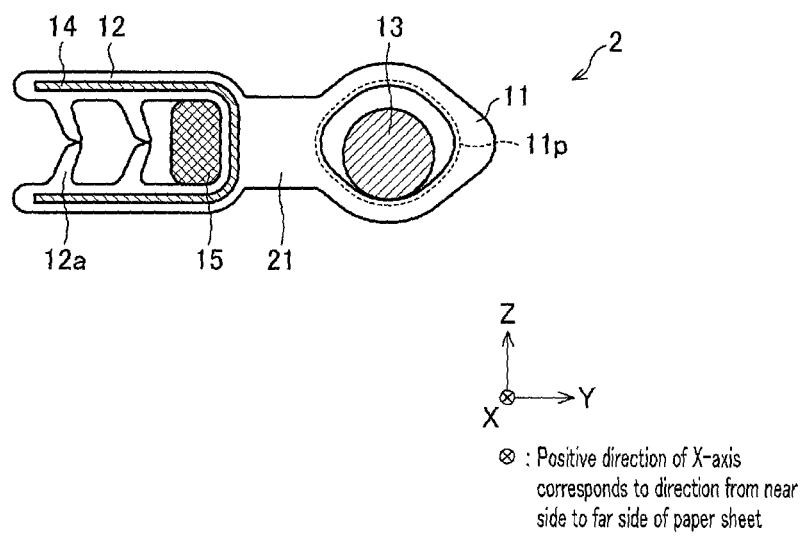

As illustrated in FIG. 4, a vehicle damping material 2 in accordance with an embodiment of the present invention has a structure in which a gripping section 12 is provided with a supporting section 21 that elastically supports a mass body containing section 11. Since the supporting section 21 is provided, the supporting section 21 functions as a spring in a case where the automobile door 500 vibrates. In the vehicle damping material 1, portions which serve as a spring are a portion in the mass body containing section 11 which portion is substantially opposed to the gripping section 12, and a portion which forms the space 11d. As compared to these portions which serve as a spring in the vehicle damping material 1, a portion (i.e., the supporting section 21) which serves as a spring in the vehicle damping material 2 is larger in area. Accordingly, attachment of the vehicle damping material 2 makes it possible to obtain a higher damping effect. As a length of the supporting section 21 in a Y-axis direction is increased, the area of the portion serving as a spring increases. This further leads to further increase in the damping effect.

Note that though in the vehicle damping material 2, the supporting section 21 is made of the same elastic material as the mass body containing section 11 and the gripping section 12, the supporting section 21 may be made of an elastic material which is different from an elastic material of which the mass body containing section 11 and the gripping section 12 are made.

Further, though not illustrated, vehicle damping materials in accordance with other possible embodiments of the present invention encompass, for example, a vehicle damping material having no space 11d in a hollow section 11p, a vehicle damping material provided with three or more projections 12a on each of two inner surfaces 12b of a gripping section 12, a vehicle damping material including a plurality of core members 14 embedded in a gripping section 12, and the like damping materials.

<Damping Effect Obtained in a Case where Vehicle Damping Material is Attached>

Figure 5:
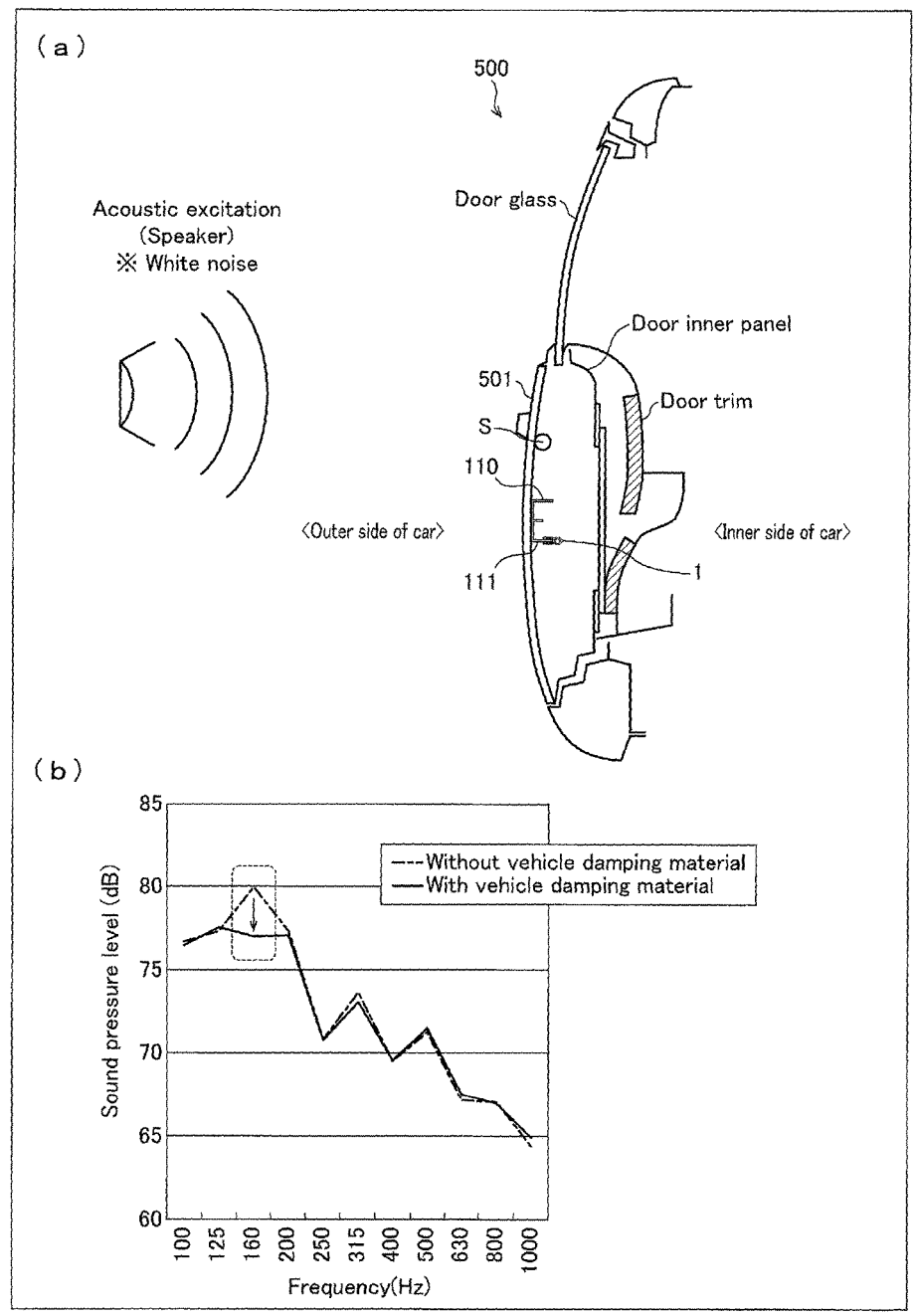

With reference to FIG. 5, the following discusses a damping effect obtained in a case where the vehicle damping material 1 is attached to the reinforcing frame 110.

For each of (1) a case where no vehicle damping material was attached to the reinforcing frame 110 (not illustrated) and (2) a case where the vehicle damping material 1 was attached to the reinforcing frame 110 as illustrated in (a) of FIG. 5, sound pressure levels were measured as follows: first, white noise was outputted toward the automobile door 500 from a speaker (not illustrated) provided outside an automobile, so that the automobile door 500 would be subjected to acoustic excitation; and then, sound pressure levels were measured at a sound measurement position S located on an upper side, in a vertical direction, of the reinforcing frame 110 in a space formed between the door outer panel 501 and a door inner panel. Note that in this measurement, 1/3 octave analysis was carried out and sound pressure levels at respective frequencies were compared with each other.

As shown in a graph of (b) of FIG. 5, in (1) the case where no vehicle damping material was attached to the reinforcing frame 110 (not illustrated), a sound pressure level of approximately 80 dB was measured at a frequency of 160 Hz, at the sound measurement position S. On the other hand, in (2) the case where the vehicle damping material 1 was attached to the reinforcing frame 110, a sound pressure level of approximately 77 dB was measured at a frequency of 160 Hz, at the sound measurement position S. This revealed that attachment of the vehicle damping material 1 to the reinforcing frame 110 reduced the sound pressure level by approximately 3 dB.

It was found from this experimental result that a high damping effect can be obtained by attachment of the vehicle damping material 1 to a vehicle member such as the reinforcing frame 110. More specifically, it was found that in a case where the iron core 13 is contained in the mass body containing section 11 made of an elastic material, a portion substantially opposed to the gripping section 12 functions as a spring in the mass body containing section 11, so that the iron core 13 effectively absorbs vibrations.

<Structure of Damping Material in Accordance with Another Embodiment>

Figure 6:
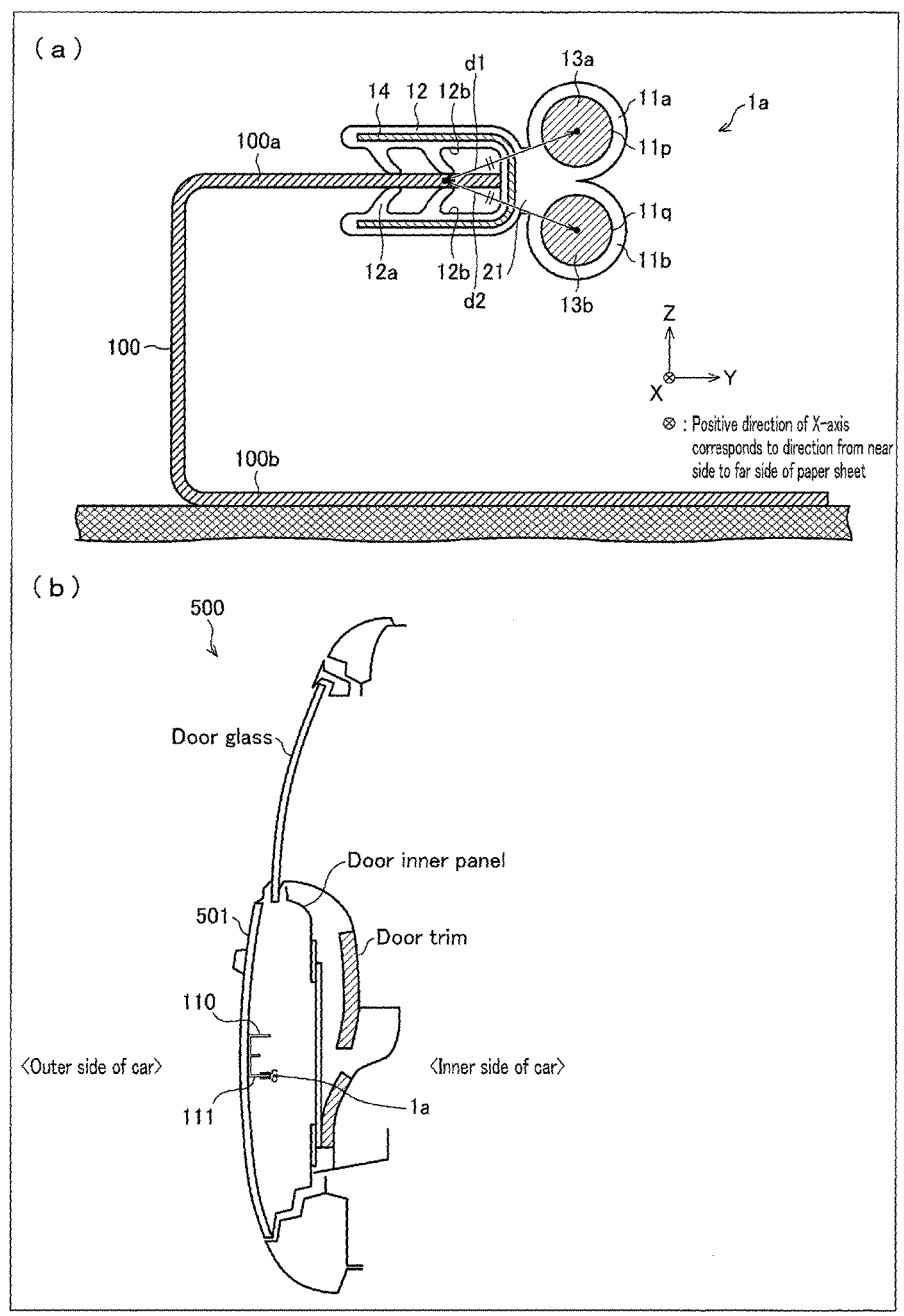

Next, the following discusses a structure of a damping material 1a in accordance with another embodiment of the present invention, with reference to FIG. 6. (a) of FIG. 6 is a cross sectional view illustrating the damping material 1a, taken along a plane orthogonal to an X-axis.

The damping material 1a as illustrated in (a) of FIG. 6 is attached to a plate-like protruding portion provided in a flange member (vibration-suppression-target member, target member whose vibration is to be damped) 100. (a) of FIG. 6 illustrates a state in which the damping material 1a is attached to a joist of a ceiling structure of a building. As illustrated in (a) of FIG. 6, the damping material 1a is fixed to the flange member 100 by pinching by use of a gripping section 12. Note that the flange member 100 may be any of various flanges in an automobile as described above, in other words, the flange member 100 is attached to any structure. The following description will discuss embodiments as mere examples in nature, and is not intended to limit the scope, application, or uses of the present disclosure.

(b) of FIG. 6 illustrates a structure of an automobile door 500 to which the damping material 1a as illustrated in (a) of FIG. 6 is attached (the same applies to damping materials 1b to 1e described later). As illustrated in (b) of FIG. 6, the damping material 1a is attached to a reinforcing frame 110 provided on a door outer panel 501 of the automobile door 500, so as to reduce vibrations and impact sounds of the automobile door 500. More specifically, as illustrated in (b) of FIG. 6, the damping material 1a is attached to a protruding portion 111 provided at the lowest position in a vertical direction among three flat plate-like protruding portions of the reinforcing frame 110. Note that the damping material 1a may be attached to either one of two protruding portions other than the protruding portion 111. Further, an aspect, illustrated in (b) of FIG. 6, in which the damping material 1a is attached is merely one example. The damping material 1a can be attached to protruding portions or the like of various vehicle members, other than the reinforcing frame 110, which constitute an automobile (not illustrated).

The following discusses the damping material 1a, with reference to (a) of FIG. 6. The damping material 1a includes two mass body containing sections 11a and 11b and the gripping section 12 which are each made of an elastic material, columnar iron cores (mass bodies) 13a and 13b, and a core member 14. The damping material 1a is fixed to the flange member 100 by pinching, by use of the gripping section 12, an end of a flat plate portion 100a which extends in a Y-axis direction (substantially horizontal direction in (a) of FIG. 6) so as to be opposed to a contact flat plate portion 100b of the flange member 100.

Further, the damping material 1a includes a supporting section 21 which is provided in a position extending in the Y-axis direction (substantially horizontal direction in (a) of FIG. 6) from the gripping section 12 so as to be continuous with the gripping section 12. The supporting section 21 elastically supports the mass body containing sections 11a and 11b which are aligned in a Z-axis direction (substantially vertical direction in (a) of FIG. 6) at a tip of the supporting section 21. The two mass body containing sections 11a and 11b are formed so as to be connected to the supporting section 21, in such a manner that the two mass body containing sections 11a and 11b share a common portion where parts of respective side surfaces, opposed to each other, of the two mass body containing sections 11a and 11b are connected to each other. The supporting section 21 is provided between the mass body containing sections 11a and 11b and the gripping section 12, so that mainly the supporting section 21 serves as a spring in a case where the flange member 100 vibrates. Note that an elastic material of which the supporting section 21 is made may be the same as or different from an elastic material of which each of the mass body containing sections 11a and 11b and the gripping section 12 is made (details of the elastic material will be described later). Though the following discusses, as an example, a case where a damping material includes two mass body containing sections, an embodiment of the present invention is not limited to this example and the damping material may include three or more mass body containing sections.

Each of the mass body containing sections 11a and 11b has a substantially circular cross section, taken along a plane orthogonal to the X-axis of (a) of FIG. 6. Further, the mass body containing sections 11a and 11b respectively include hollow sections 11p and 11q which are formed for containing the iron cores 13a and 13b, respectively. The hollow sections 11p and 11q each have a substantially circular cross section, taken along a plane orthogonal to the X-axis. Further, the hollow sections 11p and 11q are formed so as to have respective shapes which allow insertion of the iron cores 13a and 13b. Then, the iron cores 13a and 13b are inserted into the hollow sections 11p and 11q, so that the mass body containing sections 11a and 11b contain the iron cores 13a and 13b.

Note that the shapes of the respective cross sections of the mass body containing sections 11a and 11b are each not limited to a circular shape, but can be any of various shapes such as a substantially rectangular shape, a substantially square shape, an oblong shape, and a substantially rhombus shape. Further, the shapes of the respective cross sections of the hollow sections 11p and 11q are each also not limited to a substantially circular shape. The shapes of the respective cross sections of the hollow sections 11p and 11q can be changed in accordance with shapes and sizes of respective shapes of cross sections of the iron cores 13a and 13b taken along a plane orthogonal to the X-axis of (a) of FIG. 6, or in accordance with the shapes of the mass body containing sections 11a and 11b. The shapes of the respective cross sections of the hollow sections 11p and 11q only need to be shapes that allow the iron cores 13a and 13b to be contained in the mass body containing sections 11a and 11b, respectively.

Assume here that a distance d1 is one of a distance between a centroid of the mass body containing section 11a and a centroid of the gripping section 12 in a state where the iron core 13a is inserted, while a distance d2 is a distance between a centroid of the mass body containing section 11b and the centroid of the gripping section 12 in a state where the iron core 13b is inserted. The centroid of the gripping section 12 is located at a position corresponding to a projection 12a closest to the mass body containing sections 11a and 11b among a plurality of projections 12a provided in the gripping section 12 described below. In a case where there is no projection 12a, the centroid of the gripping section 12 is located at a fixation position of the gripping section 12. In the present embodiment, as illustrated in (a) of FIG. 6, the distance d1 and the distance d2 are substantially equal to each other. Further, the side surfaces, opposed to each other, of the two mass body containing sections 11a and 11b are connected to each other up to an imaginary straight line obtained by connecting the centroids of the two mass body containing sections 11a and 11b which are aligned in the Z-axis direction.

The gripping section 12 is provided with the plurality of projections 12a for fixing the damping material 1a to the flange member 100. The projections 12a are provided such that two projections 12a (four projections in total) are provided so as to project substantially along the X-axis of (a) of FIG. 6 from each of two inner surfaces 12b which are opposed to each other in the gripping section 12.

Note that the number, the shape, positions, etc. of the projections 12a can be arbitrarily designed in accordance with, for example, a thickness of the flat plate portion 100a of the flange member 100, and in a case where the damping material 1a is to be attached to a structure other than the flange member 100, in accordance with the shape, the size, etc. of the structure to which the damping material 1a is to be attached. For example, though not illustrated in the drawings, the projections 12a may be arranged to project from only one of the two inner surfaces 12b of the gripping section 12, or each of the two inner surfaces 12b may be provided with three or more projections 12a. Further, an angle which the projections 12a each make with the inner surface 12b can be designed as appropriate in consideration of easy attachment, more reliable fixation, and the like.

Alternatively, in a case where the gripping section 12 is arranged to have a shape in which a distance between the two inner surfaces 12b is substantially equal to a thickness of the flat plate portion 100a, the damping material 1a can be fixed to the flange member 100 without provision of the projections 12a. Therefore, it is not essential to provide the projections 12a in the gripping section 12.

All of the mass body containing sections 11a and 11b, the gripping section 12, and the projections 12a are made of the same elastic material. Examples of such an elastic material used for formation of the above sections and projections encompass various rubber materials each containing, as a main component, ethylene-propylene-diene rubber (EPDM), natural rubber or chloroprene rubber (CR), various thermoplastic elastomers, urethane, and polyvinyl chloride (PVC).

Note that a material of the mass body containing sections 11a and 11b is not necessarily the same as a material of the gripping section 12, and the mass body containing section 11 and the gripping section 12 can be made of different materials. Further, a material of the projections 12a is not necessarily the same as a material of the gripping section 12, and the projections 12a and the gripping section 12 can be made of different materials. In other words, the projections 12a only need to be made of an elastic material that more reliably fixes the damping material 1a to the flange member 100.

The iron cores 13a and 13b are each a mass body, which absorbs vibrations of the flange member 100 and vibrates itself. Note that the mass body may be, for example, a mass body made of metal except for iron, other than the iron cores 13a and 13b. Further, the shape of each of the iron cores 13a and 13b is not limited to a columnar shape, but may be, for example, a prism shape including a rectangular parallelepiped shape.

The core member 14 is a member which is embedded in the gripping section 12 so as to increase rigidity of the gripping section 12 and improve fixing force of the gripping section 12. The core member 14 has a substantially U-shaped cross section, taken along a plane orthogonal to the X-axis in (a) of FIG. 6. This substantially U-shaped cross section of the core member 14 is identical in shape to a cross section of the gripping section 12. Further, the core member 14 is made of a material which increases the rigidity of the gripping section 12. Examples of such a material encompass various metals including iron, and hard resins.

Note that a thickness of the core member 14 may be arbitrarily designed in accordance with fixing force of the gripping section 12, cost, a weight of the damping material 1a, and the like which a user requires. Further, the core member 14 is merely a member for strengthening the fixing force of the gripping section 12. Therefore, the core member 14 is not an essential constituent element for the damping material 1a.

(Effects of Damping Material 1a)

The damping material 1a described above includes the mass body containing sections 11a and 11b in which the hollow sections 11p and 11q are formed, and the gripping section 12 for fixing the supporting section 21 to the flange member 100. Moreover, the mass body containing sections 11a and 11b contain the iron cores 13a and 13b, respectively, by insertion of the iron cores 13a and 13b into the hollow sections 11p and 11q. Accordingly, in a case where the damping material 1a is attached to the flange member 100, vibrations and impact sounds of the flange member 100 propagate to the mass body containing sections 11a and 11b via the gripping section 12 and the supporting section 21. Therefore, the iron cores 13a and 13b contained in the mass body containing sections 11a and 11b absorb the vibrations and the impact sounds, and vibrate instead of the flange member 100. This allows the damping material 1a to yield a damping effect by use of a simple configuration in which the damping material 1a is not separately provided with an elastic section such as a spring. (See, for example, Japanese Patent Application Publication Tokukaihei No. 5-52237 (1993).)

Further, the damping material 1a includes the gripping section 12 for fixing the damping material 1a to the flange member 100 by pinching the flange member 100. This eliminates the need for fastening with a rivet, welding, fixation with a screw, or the like, in attachment of the damping material 1a to the flange member 100, and accordingly makes it possible to attach the damping material 1a to the flange member 100 by a simple operation. Further, the damping material 1a can be fixed only by pinching the flange member 100 by use of the gripping section 12. This makes it possible to attach the damping material 1a to any of vibration-suppression-target members of various shapes and various sizes. Accordingly, it is possible to attach the damping material 1a to various vibration-suppression-target members by a simple operation. Further, the damping material 1a includes a plurality of mass body containing sections in each of which a hollow section is formed such that a mass body can be inserted into the hollow body. This makes it possible to easily adjust a resonant frequency by appropriately adjusting a size or a mass of a mass body to be inserted into each mass body containing section. Consequently, the damping material 1a can yield a damping effect on various vibration-suppression-target members.

<Modified Example 1 of Damping Material>

Figure 7:
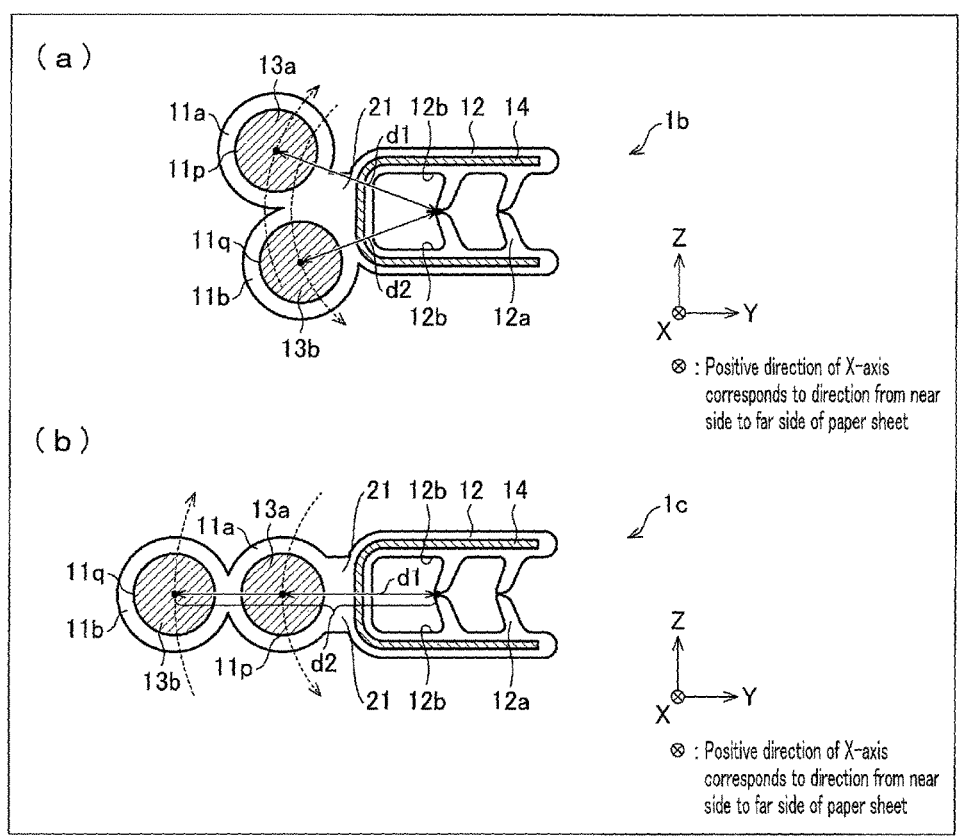

Next, with reference to (a) of FIG. 7, the following discusses Modified Example 1 of the damping material 1a in accordance with the another embodiment of the present invention. (a) of FIG. 7 is a cross sectional view of a damping material 1b in accordance with Modified Example 1, taken along a plane orthogonal to an X-axis.

The damping material 1b of Modified Example 1 is different from the above-described damping material 1a in that a distance d1 and a distance d2 are arranged to be different from each other. In a case where the distance d1 is arranged to be different from the distance d2 as described above, the damping material 1b can have two resonant frequencies, so that the damping material 1b as one part alone can manage vibrations at two resonant frequencies. Note that though the distance d2 is arranged to be smaller than the distance d1 in Modified Example 1, the distance d1 may be conversely arranged to be smaller than the distance d2.

<Modified Example 2 of Damping Material>

Next, with reference to (b) of FIG. 7, the following discusses Modified Example 2 of the damping material 1a in accordance with the another embodiment of the present invention. (b) of FIG. 7 is a cross sectional view of a damping material 1c in accordance with Modified Example 2, taken along a plane orthogonal to an X-axis.

The damping material 1c of Modified Example 2 is different in structure from the above-described damping material 1a in that all of respective centroids of mass body containing sections 11a and 11b and a centroid of a gripping section 12 are aligned substantially on one line. Further, one mass body containing section 11a is connected to a tip of another mass body containing section 11b, in a position extending in a Y-axis direction from the tip of the another mass body containing section 11b. In this Modified Example 2, a distance d1 and a distance d2 are different from each other. This allows the damping material 1c to have two resonant frequencies, so that the damping material 1c as one part alone can manage vibrations at two resonant frequencies. The damping material 1c is similar in this point to the damping material 1b in accordance with Modified Example 1 described above. Note that it is also possible to take an embodiment in which respective centroids of the mass body containing sections 11a and 11b and the centroid of the gripping section 12 are not aligned on one line.

<Modified Example 3 of Damping Material>

Figure 8:
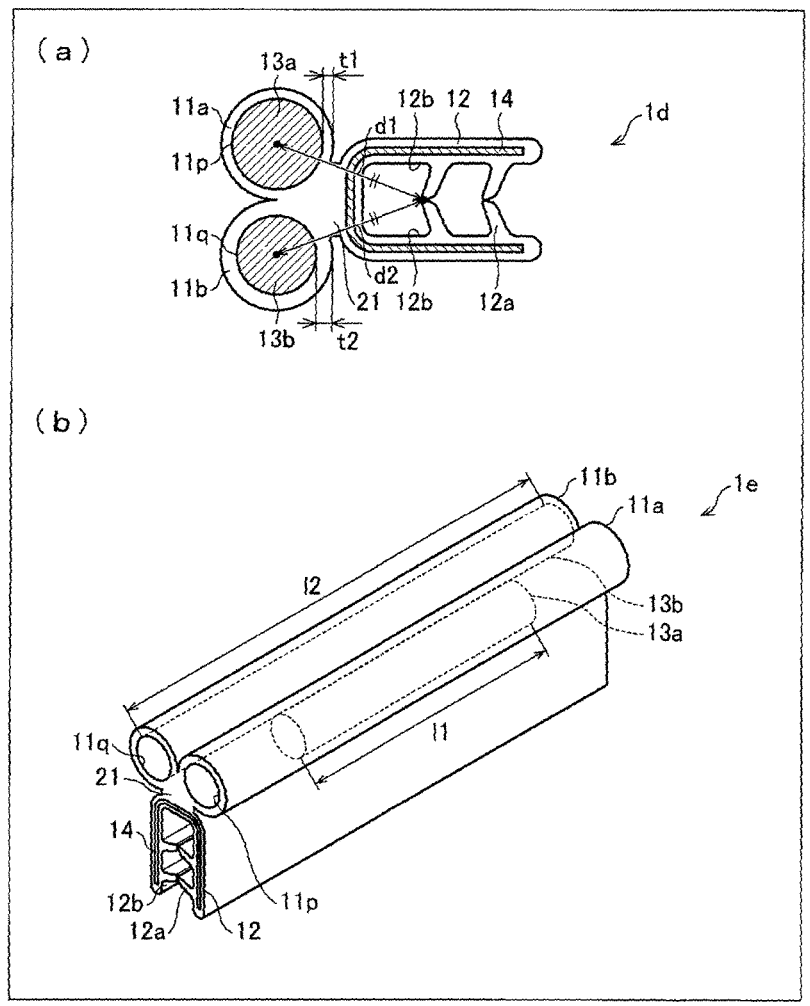

Next, with reference to (a) of FIG. 8, the following discusses Modified Example 3 of the damping material 1a in accordance with the another embodiment of the present invention. (a) of FIG. 8 is a cross sectional view of a damping material 1d in accordance with Modified Example 3, taken along a plane orthogonal to an X-axis.

In the damping material 1d in accordance with Modified Example 3, a thickness (wall thickness of the mass body containing section 11a) t1 defined by an inner surface on a periphery of a hollow section 11p of one mass body containing section 11a and an outer surface of the mass body containing section 11a is different from a thickness (wall thickness of the mass body containing section 11b) t2 defined by an inner surface on a periphery of a hollow section 11q of one mass body containing section 11b and an outer surface of the mass body containing section 11b. In this point, the damping material 1d is different from the above-described damping material 1a. It is possible to adjust a resonant frequency by appropriately setting each of the wall thicknesses t1 and t2 of the mass body containing sections 11a and 11b. Note that though one distance d1 is substantially equal to the other distance d2 in Modified Example 3, the distance d1 may be different from the other distance d2. Meanwhile, wall thicknesses of the two mass body containing sections 11a and 11b in an embodiment of Modified Example 2 described above can be arranged to be different from each other as in Modified Example 3.

<Modified Example 4 of Damping Material>

Next, with reference to (b) of FIG. 8, the following discusses Modified Example 4 of the damping material 1a in accordance with the another embodiment of the present invention. (b) of FIG. 8 is a perspective view illustrating a damping material 1e in accordance with Modified Example 4.

In the damping material 1e of Modified Example 4, a length 11 of an iron core 13a in an insertion direction in which the iron core 13a is inserted into a hollow section 11p of a mass body containing section 11a is different from a length 12 of an iron core 13b in an insertion direction in which the iron core 13b is inserted into a hollow section 11q of a mass body containing section 11b. In this point, the damping material 1e is different from the above-described damping material 1a. It is possible to adjust resonant frequencies, by appropriately adjusting the length 11 of the iron core 13a and the length 12 of the iron core 13b in such a manner that the length 11 of the iron core 13a is different from the length 12 of the iron core 13b.

Note that in Modified Example 4, the lengths 11 and 12 of the iron cores 13a and 13b made of the same material are arranged to be different from each other, so that respective masses of the iron cores 13a and 13b, which are mass bodies, are made different from each other. However, even in a case where two mass bodies have the same length, respective masses of the two mass bodies may be made different from each other by using two mass bodies made of different materials, respectively, or by using two mass bodies having different thicknesses, respectively. In this way, it is possible to adjust resonant frequencies, by adjustment in which masses of mass bodies inserted into two or more mass body containing sections, respectively, are made different from each other.

<Confirmation Test of Resonant Frequencies of Damping Materials>

Figure 9:
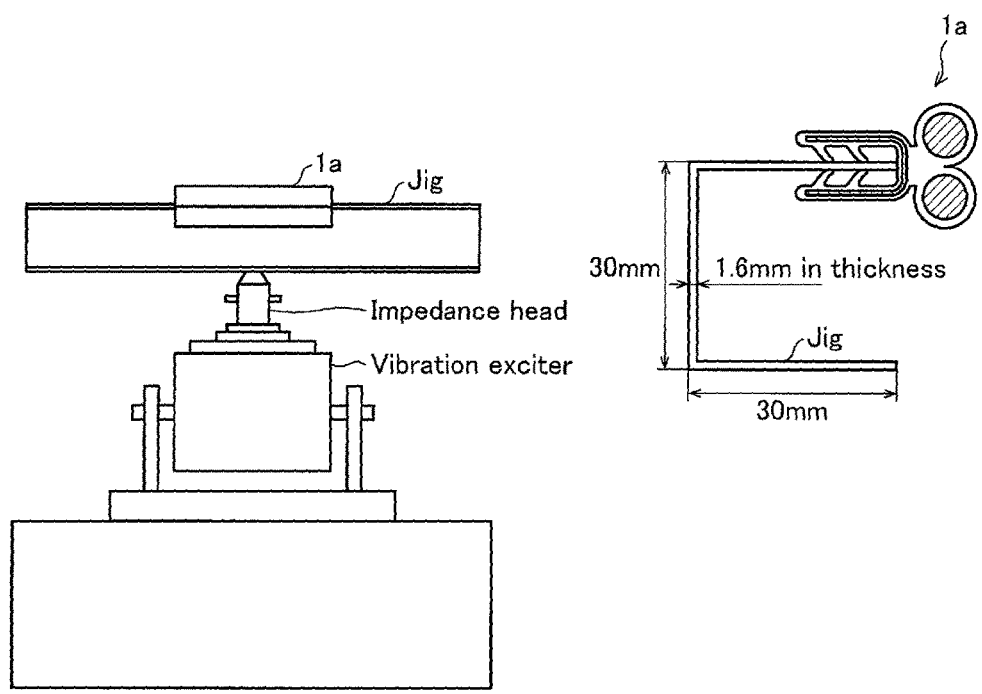

Next, with reference to FIG. 9, the following discusses a test method for confirming resonant frequencies of damping materials in accordance with embodiments of the present invention. In accordance with the test method, frequency characteristics were measured by use of a device which is to be used in a center excitation method among test methods for a vibration-damping property in damped composite beam of unrestrained type in accordance with JIS K7391. As illustrated in FIG. 9, a jig obtained by processing an iron plate having a thickness of 1.6 mm into a U shape (each side portion: 30 mm) was mounted on an impedance head of the device. In this mounting of the jig, a bottom portion of the U shape was attached to the impedance head, and for example, a damping material 1a was attached along a horizontal direction to a top portion of the U shape. Then, the U shape jig was vibrated by a vibration exciter, so that a resonant frequency was obtained from a graph of a frequency response function.

Figure 10:
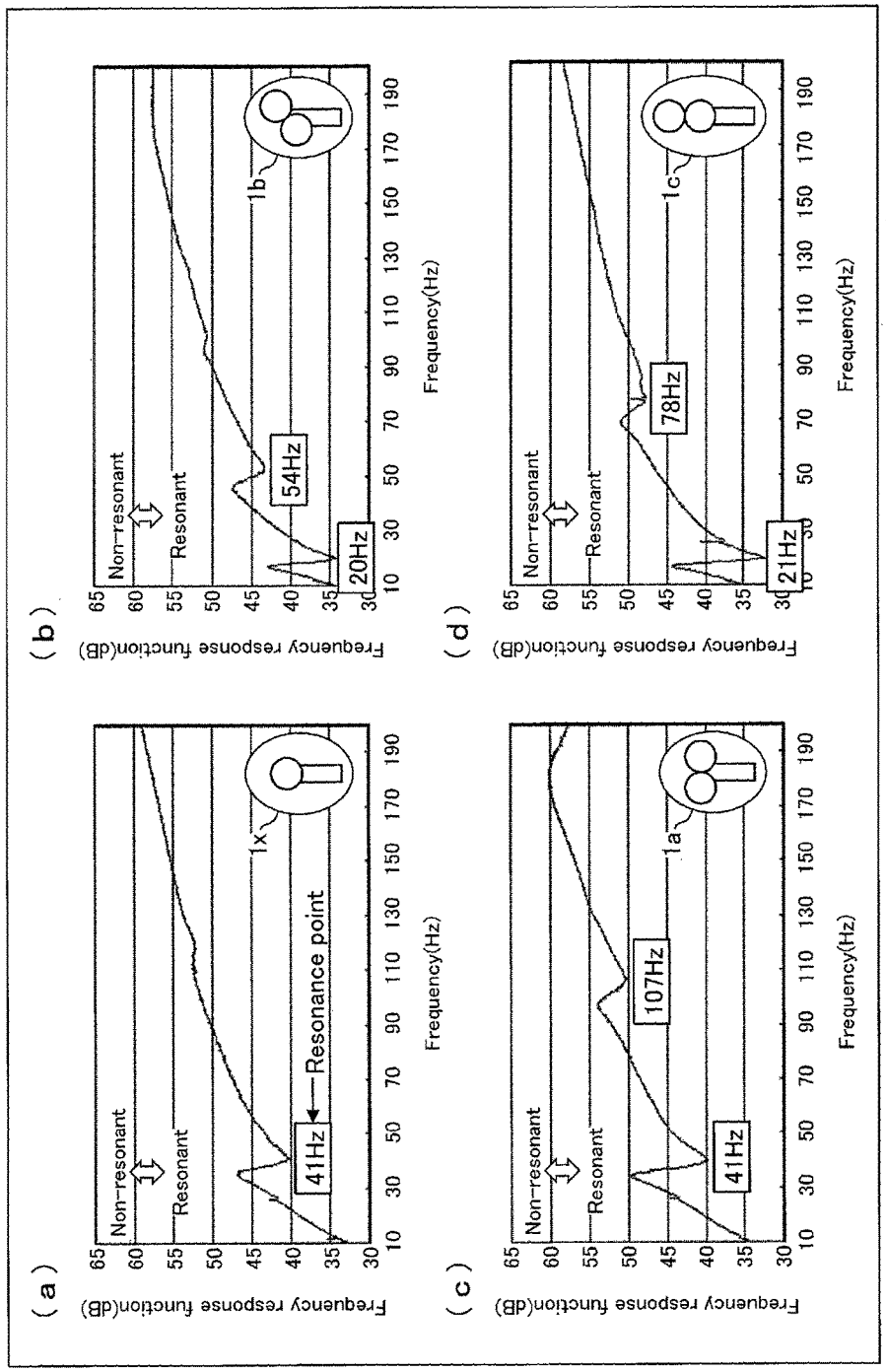

(a) through (d) of FIG. 10 each show a resonance result of each of four different types of damping materials in accordance with different embodiments. Each graph has, at its right-edge corner, a schematic view illustrating a configuration of a damping material used in a test. In this schematic view, a circular part(s) represents a mass body containing section(s), and a substantially quadrangular part represents a gripping section. This schematic view illustrates a positional relation of a mass body containing section(s) and a gripping section.

Figure 12:
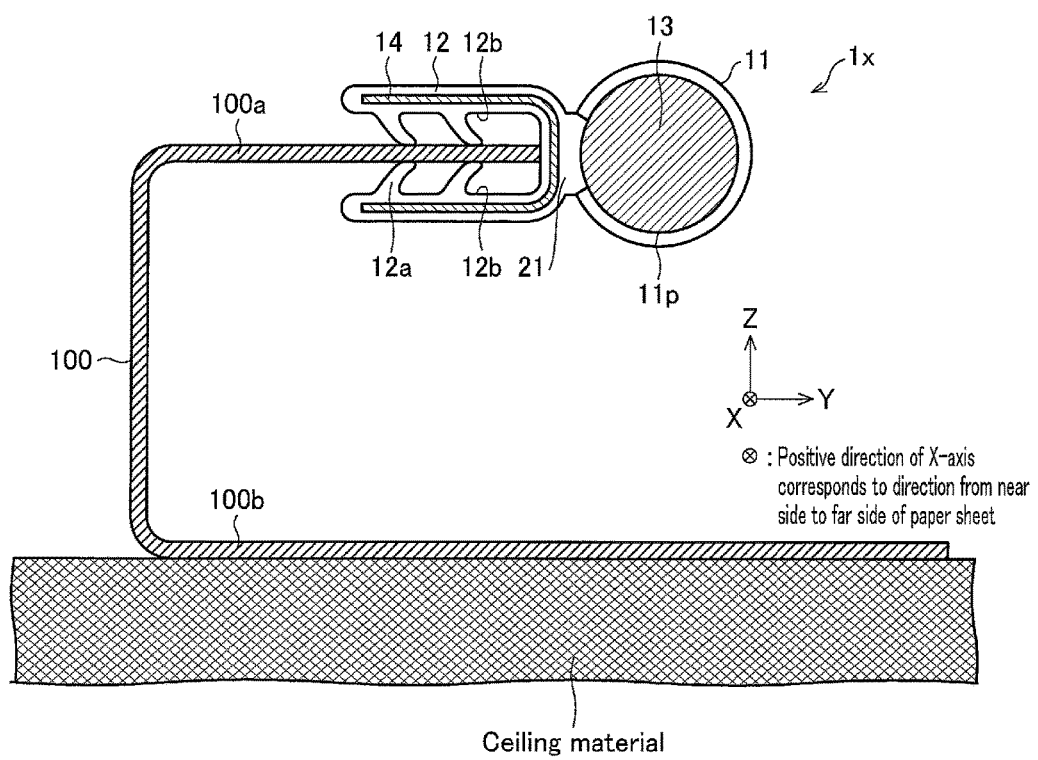
FIG. 12 is a cross sectional view illustrating a configuration of a damping material in accordance with a reference example.

(a) of FIG. 10 shows, as a reference example, a resonance result of a damping material 1x (FIG. 12) including one mass body containing section. This graph has only one resonance point at 41 Hz.

(b) of FIG. 10 shows a resonance result of a damping material 1b ((a) of FIG. 7), as a modified example of a damping material in accordance with another embodiment of the present invention. This graph shows a state in which two resonance points exist at 20 Hz and 54 Hz.

(c) of FIG. 10 shows a resonance result of a damping material 1a ((a) of FIG. 6) in accordance with the another embodiment of the present invention. This graph shows a state in which two resonance points exist at 41 Hz and 107 Hz.

(d) of FIG. 10 shows a resonance result of a damping material 1c ((b) of FIG. 7), as a modified example of the damping material in accordance with the another embodiment of the present invention. This graph shows a state in which two resonance points exist at 21 Hz and 78 Hz. The above results show that a damping material can have two resonant frequencies by providing two mass body containing sections in a damping material.

<Structure of Damping Material in Accordance with Still Another Embodiment of Present Invention>

Figure 11:
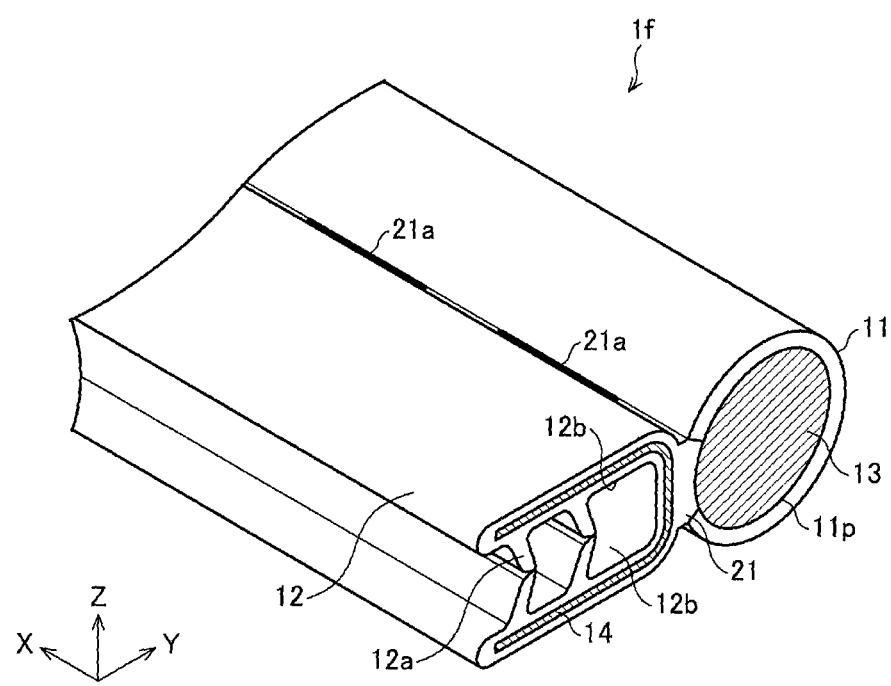
FIG. 11 is a perspective view illustrating a configuration of a damping material in accordance with still another embodiment of the present invention.

Next, the following discusses a structure of a damping material 1f in accordance with still another embodiment of the present invention, with reference to FIG. 11. The damping material 1f in accordance with the present embodiment is different from the damping material 1x in accordance with a referential example illustrated in FIG. 12, in that the damping material 1f has a plurality of slits (cut sections) 21a which are formed along an X-axis direction in a supporting section 21 (the X-axis direction corresponding to a direction in which an iron core 13 extends). The slits 21a are formed by cutting part of the supporting section 21. Note that the number of the slits 21a is not necessarily two or more and the scope of the present invention encompasses an embodiment in which only one slit 21a is formed in the damping material 1f.

Further, each of the slits 21a of the present embodiment is formed by cutting the supporting section 21 thoroughly from one side to the other side of the supporting section 21 in a Z-axis direction. In other words, the slits 21a penetrate the supporting section 21 along the Z-axis direction. Further, the slits 21a have a substantially rectangular-shape cross section, taken along a plane orthogonal to a Z-axis. However, the shape of the cross section of the slits 21 is not limited to a substantially rectangular shape, but can take any of various cross sectional shapes such as a substantially circular shape, a substantially ellipse shape, and a substantially square shape. In other words, the cut sections are not limited in form to a slit form as in the present embodiment, and the scope of the present invention encompasses an embodiment in which the cut sections are formed simply as through holes.

The damping material 1f described above makes it possible to easily adjust a character frequency of the damping material 1f, by a simple method in which the slits 21a are formed in the supporting section 21. Further, since it is only necessary to form the slits 21a for adjusting the character frequency, there is no need for setting a shape or a size of the damping material 1f for each character frequency. This makes it possible to suppress production cost. As described above, it is possible to suppress production cost and at the same time to easily adjust the character frequency of the damping material 1f.

<Modified Example of Damping Material in Accordance with Still Another Embodiment of Present Invention>

Figure 13:
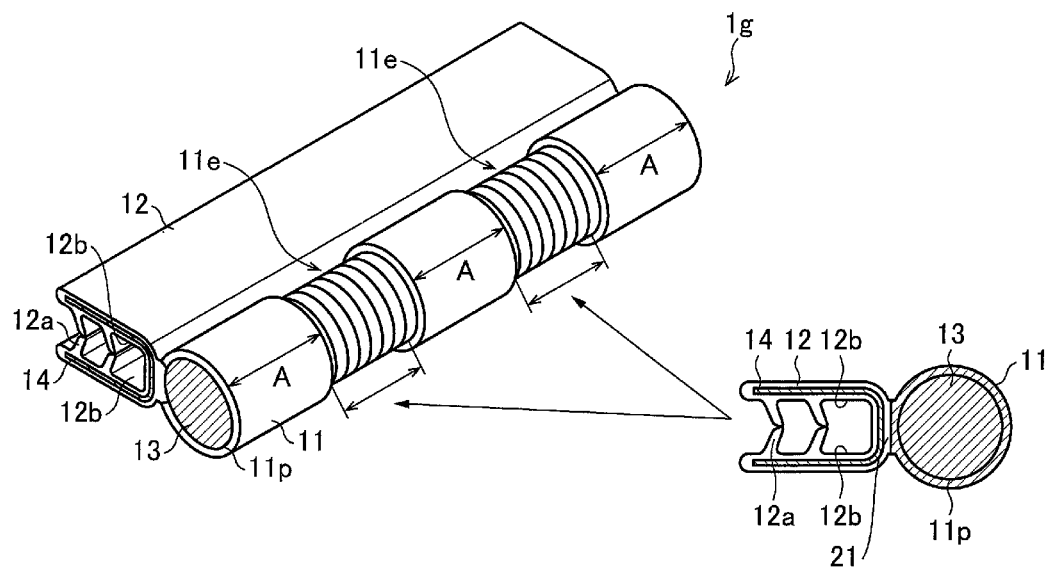
FIG. 13 is a perspective view illustrating a configuration of a modified example of the damping material in accordance with the still another embodiment of the present invention.

Next, the following discusses a structure of a damping material 1g in accordance with a modified example of the damping material 1f in accordance with the still another embodiment of the present invention, with reference to FIG. 13. As illustrated in FIG. 13, the damping material 1g of the present modified example is obtained by forming a plurality of cut parts (cut sections) 11e by cutting off portions of a mass body containing section 11 of the damping material 1x in accordance with the referential example illustrated in FIG. 12. As in the present modified example, the cut sections can be formed in the mass body containing section 11 other than in the supporting section 21.

The damping material 1g described above makes it possible to easily adjust a character frequency of the damping material 1g, by a simple method in which the cut parts 11e are formed in the mass body containing section 11. Further, since it is only necessary to form the cut parts 11e for adjusting the character frequency, there is no need for setting a shape or a size of the damping material 1g for each character frequency. This makes it possible to suppress production cost. As described above, it is possible to suppress production cost and at the same time to easily adjust the character frequency of the damping material 1g.

[Main Points]

In order to solve the above problems, a damping material in accordance with an embodiment of the present invention is a damping material to be attached to a vibration-suppression-target member, the damping material including: a mass body containing section in which a hollow section is formed for containing a mass body; and a gripping section for fixing the damping material to the vibration-suppression-target member by pinching the vibration-suppression-target member, the mass body containing section and the gripping section each being made of an elastic material, and the mass body being inserted into the hollow section.

In the above configuration, the damping material in accordance with the embodiment of the present invention includes the mass body containing section in which the hollow section is formed, and the gripping section for fixing the damping material to the vibration-suppression-target member. Moreover, the mass body containing section contains the mass body by insertion of the mass body into the hollow section. Accordingly, in a case where the damping material in accordance with the embodiment of the present invention is attached to the vibration-suppression-target member, vibrations and impact sounds of the vibration-suppression-target member propagate to the mass body containing section via the gripping section. The gripping section has a portion opposed to the mass body containing section and mainly this portion functions as a spring in the above case because the mass body containing section is made of an elastic material. Therefore, the mass body contained in the mass body containing section absorbs the vibrations and the impact sounds, and vibrates instead of the vibration-suppression-target member.

This allows the damping material in accordance with the embodiment of the present invention to yield a damping effect by use of a simple configuration in which the damping material is not separately provided with an elastic section such as a spring.

Further, in the above configuration, the gripping section is not only made of an elastic material but also formed into a shape capable of pinching the vibration-suppression-target member. This eliminates the need for fastening with a rivet, welding, fixation with a screw, or the like, in attachment of the damping material in accordance with the embodiment of the present invention to the vibration-suppression-target member, and accordingly makes it possible to attach, at low cost, the damping material to the vibration-suppression-target member by a simple operation. Further, the damping material in accordance with the embodiment of the present invention can be fixed only by pinching the vibration-suppression-target member by use of the gripping section. This makes it possible to attach the damping material to any of vibration-suppression-target members of various shapes and various sizes.

Further, in order to solve the above problems, a damping material in accordance with an embodiment of the present invention is preferably arranged such that: a space is formed between the mass body and an inner wall surface of the hollow section.

In the above configuration, the damping material in accordance with the embodiment of the present invention is arranged such that a space is formed between the mass body and an inner wall surface of the hollow section. Accordingly, the mass body can freely move inside the hollow section. This allows the mass body to absorb vibrations further by energy loss caused by collision of the mass body with the inner wall surface of the hollow section.

Therefore, as compared to a case where the above space is not formed, the mass body can absorb more vibrations of a vibration-suppression-target member. This makes it possible to provide a damping material capable of yielding a higher damping effect.

In order to solve the above problems, a damping material in accordance with an embodiment of the present invention is preferably arranged such that: the gripping section is provided with a supporting section for elastically supporting the mass body containing section; and the mass body containing section, the supporting section, and the gripping section are formed in a continuous manner.

In the above configuration, the gripping section is provided with a supporting section for elastically supporting the mass body containing section. Accordingly, in a case where a vibration-suppression-target member vibrates or impact sounds of the vibration-suppression-target member occur, the supporting section serves as a spring, so that a damping effect can be obtained.

Further, in the above configuration, the mass body containing section, the supporting section, and the gripping section are formed in a continuous manner. This allows the damping material to be formed as a long material by extrusion molding or the like, even in a case where the supporting section is provided in the damping material in accordance with the embodiment of the present invention.

In order to solve the above problems, a damping material in accordance with an embodiment of the present invention is preferably arranged such that: a core member is embedded in the gripping section.

In the above configuration, a core member is embedded in the gripping section. Accordingly, as compared to a case where no core member is embedded in the gripping section, rigidity of the gripping section increases. This causes surfaces of a vibration-suppression-target member pinched by the gripping section to be more strongly pressed. Accordingly, the gripping section is more reliably fixed to the vibration-suppression-target member. This makes it possible to provide a damping material which can be more reliably fixed to a vibration-suppression-target member.

Further, in order to solve the above problems, a damping material in accordance with an embodiment of the present invention is preferably arranged such that: the gripping section is provided with a projection for fixing the damping material to the vibration-suppression-target member, the projection projecting from at least one of two inner surfaces of the gripping section, the two inner surfaces being opposed to each other.

In the above configuration, the projection is provided so as to project from at least one of two inner surfaces of the gripping section which two inner surfaces are opposed to each other. This causes at least one surface of a vibration-suppression-target member pinched by the gripping section to be more strongly pressed. This makes it possible to more reliably fix the damping material to the vibration-suppression-target member.

Further, it is possible to easily pinch a vibration-suppression-target member by the gripping section since the projection is made of an elastic material. Accordingly, as compared to a case where no projection is provided, easiness of an attachment operation of the damping material is not impaired.

The above makes it possible to provide a damping material which can be more reliably fixed to the vibration-suppression-target member while ensuring easy attachment.

Further, in order to solve the above problems, a damping material in accordance with an embodiment of the present invention is preferably arranged such that: the mass body to be inserted into the hollow section is capable of being changed in mass.

In the above configuration, a user can insert as appropriate, into the hollow section, a mass body having a mass that leads to a damping effect on vibrations at a frequency which the user desires to attenuate. Therefore, the damping material in accordance with the embodiment of the present invention can yield a damping effect accurately on vibrations of a vibration-suppression-target member at various frequencies.

Further, in order to solve the above problems, a damping material in accordance with an embodiment of the present invention is preferably arranged such that: the gripping section includes a pinching space filled with a sealant for fixing the damping material to the vibration-suppression-target member, the pinching space being formed by two inner surfaces and an inner side surface of the gripping section, the two inner surfaces being opposed to each other and the inner side surface intersecting with the two inner surfaces.

In the above configuration, the pinching space formed in the gripping section is filled with a sealant. The sealant has an adhesive effect. Accordingly, since a vibration-suppression-target member is inserted into the sealant when the vibration-suppression-target member is pinched by the gripping section, the gripping section can be more reliably fixed to the vibration-suppression-target member.

In order to solve the above problems, a damping material in accordance with another embodiment of the present invention is a damping material to be attached to a vibration-suppression-target member, the damping material including: a plurality of mass body containing sections in which hollow sections are formed, respectively; and a gripping section for fixing the damping material to the vibration-suppression-target member by pinching the vibration-suppression-target member, the hollow sections being formed into shapes which allow mass bodies to be inserted into the hollow sections, respectively.

In the above configuration in accordance with the another embodiment of the present invention, each feature which are the same as that in the damping material having been described earlier in accordance with any of the embodiments of the present invention yields effects similar to that in the damping material in accordance with any of the embodiments. The following discusses another feature in the above configuration, which feature has not yet been discussed.

In the above configuration, the damping material includes a plurality of mass body containing sections in which hollow sections are formed, respectively. Into the hollow sections, mass bodies can be inserted, respectively. Accordingly, it is possible to easily adjust a size or a mass of a mass body which is to be inserted into each mass body containing section. This makes it possible to obtain a damping effect on various vibration-suppression-target members.

Further, a damping material in accordance with another embodiment of the present invention may be arranged such that: in a state in which the mass bodies are inserted into the hollow sections, respectively, a distance from a centroid of the gripping section to a centroid of one of the mass body containing sections is different from a distance from the centroid of the gripping section to a centroid of another one of the mass body containing sections. This configuration has different distances from the centroid of the gripping section to centroids of the mass body containing sections into which the mass bodies are inserted, respectively. This allows the damping material to have a plurality of resonant frequencies, so that one damping material alone can be used for managing vibrations at a plurality of resonant frequencies.

Further, a damping material in accordance with another embodiment of the present invention may be arranged such that: a cross-sectional thickness between an inner surface on a periphery of one of the hollow sections and an outer surface of a mass body containing section corresponding to the one hollow section is different from a cross-sectional thickness between an inner surface on a periphery of another one of the hollow sections and an outer surface of another mass body containing section corresponding to the another one hollow section. This configuration makes it possible to adjust a resonant frequency by appropriately setting a cross-sectional thickness of each of the plurality of mass body containing sections.

Further, a damping material in accordance with another embodiment of the present invention may be arranged such that: a length of one of the mass bodies is different from a length of another one of the mass bodies, in a direction in which the mass bodies are inserted into the mass body containing sections, respectively. This configuration makes it possible to adjust a resonant frequency by appropriately adjusting a length of a mass body which is inserted into each of the plurality of mass body containing sections.

Further, a damping material in accordance with another embodiment of the present invention may be arranged such that: a mass of one of the mass bodies is different from a mass of another one of the mass bodies, the mass bodies being inserted into the mass body containing sections, respectively. This configuration makes it possible to adjust a resonant frequency by appropriately adjusting a mass of a mass body which is inserted into each of the plurality of mass body containing sections.

In order to solve the above problems, a damping material in accordance with still another embodiment of the present invention is a damping material to be attached to a vibration-suppression-target member, the damping material including: a mass body containing section in which a hollow section is formed for containing a mass body; and a gripping section for fixing the damping material to the vibration-suppression-target member by pinching the vibration-suppression-target member, the gripping section being provided with a supporting section for elastically supporting the mass body containing section, the mass body being inserted into the hollow section, and either one of the supporting section and the mass body containing section being provided with a cut section.

In the above configuration in accordance with the still another embodiment of the present invention, each feature which is the same as that in the damping material having been described above in accordance with any of the embodiments or another embodiments of the present invention yields effects similar to that in the damping material in accordance with any of the embodiments or another embodiments. The following discusses another feature in the above configuration, which feature has not yet been discussed.

The above configuration makes it possible to easily adjust a character frequency of the damping material, by a simple method in which a cut section is formed in either one of the supporting section and the mass body containing section. Further, since it is only necessary to form the cut section for adjusting the character frequency, there is no need for setting a shape or a size of the damping material for each character frequency. This makes it possible to suppress production cost. As described above, it is possible to suppress production cost and at the same time to easily adjust the character frequency of the damping material.

Further, a damping material in accordance with still another embodiment of the present invention may be arranged such that: the cut section is plurally provided. This configuration makes it possible to easily adjust a character frequency of the damping material by appropriately adjusting the number of cut sections.

Further, a damping material in accordance with still another embodiment of the present invention may be arranged such that: the cut section is formed in the supporting section. As described above, mainly the supporting section functions as a spring. Accordingly, the character frequency of the damping material can be easily adjusted by formation of a cut section in the supporting section as in the above configuration.

[Additional Statement]

The present invention is not limited to the embodiments, but can be altered by a skilled person in the art within the scope of the claims. An embodiment derived from a proper combination of technical means each disclosed in a different embodiment is also encompassed in the technical scope of the present invention. Further, a novel technical feature can be produced by combining technical means disclosed in the embodiments.

REFERENCE SIGNS LIST 1, 2 vehicle damping material
1a to 1g damping material
11 mass body containing section
11a, 11b mass body containing section
11e cut part (cut section)
11p, 11q hollow section
12 gripping section
12a projection
12b inner surface
12c inner side surface
12d pinching space
13, 13a, 13b iron core (mass body)
14 core member
15 sealant
21 supporting section
21a slit (cut section)
100 flange member (vibration-suppression-target member)
110 reinforcing frame (vibration-suppression-target member)
d1, d2 distance
t1, t2 thickness
l1, l2 length

The invention claimed is:

1. A damping material to be attached to a vibration-suppression-target member, the damping material comprising:
a mass body containing section in which a hollow section is formed for containing a mass body; and
a gripping section for fixing the damping material to the vibration-suppression-target member by pinching the vibration-suppression-target member,
the mass body containing section and the gripping section each being made of an elastic material, and
the mass body being inserted into the hollow section.

2. The damping material as set forth in claim 1, wherein:
a space is formed between the mass body and an inner wall surface of the hollow section.

3. The damping material as set forth in claim 1, wherein:
the gripping section is provided with a supporting section for elastically supporting the mass body containing section; and
the mass body containing section, the supporting section, and the gripping section are formed in a continuous manner.

4. The damping material as set forth in claim 1, wherein:
a core member is embedded in the gripping section.

5. The damping material as set forth in claim 1, wherein:
the gripping section is provided with a projection for fixing the damping material to the vibration-suppression-target member, the projection projecting from at least one of two inner surfaces of the gripping section, the two inner surfaces being opposed to each other.

6. The damping material as set forth in claim 1, wherein:
the mass body to be inserted into the hollow section is capable of being changed in mass.

7. The damping material as set forth in claim 1, wherein:
the gripping section includes a pinching space filled with a sealant for fixing the damping material to the vibration-suppression-target member, the pinching space being formed by two inner surfaces and an inner side surface of the gripping section, the two inner surfaces being opposed to each other and the inner side surface intersecting with the two inner surfaces.

8. A damping material to be attached to a vibration-suppression-target member, the damping material comprising:
a plurality of mass body containing sections in which hollow sections are formed, respectively; and
a gripping section for fixing the damping material to the vibration-suppression-target member by pinching the vibration-suppression-target member,
the hollow sections being formed into shapes which allow mass bodies to be inserted into the hollow sections, respectively.

9. The damping material as set forth in claim 8, wherein:
in a state in which the mass bodies are inserted into the hollow sections, respectively, a distance from a centroid of the gripping section to a centroid of one of the mass body containing sections is different from a distance from the centroid of the gripping section to a centroid of another one of the mass body containing sections.

10. The damping material as set forth in claim 8, wherein:
a cross-sectional thickness between an inner surface on a periphery of one of the hollow sections and an outer surface of a mass body containing section corresponding to the one hollow section is different from a cross-sectional thickness between an inner surface on a periphery of another one of the hollow sections and an outer surface of another mass body containing section corresponding to the another one hollow section.

11. The damping material as set forth in claim 8, wherein:
a length of one of the mass bodies is different from a length of another one of the mass bodies, in a direction in which the mass bodies are inserted into the mass body containing sections, respectively.

12. The damping material as set forth in claim 8, wherein:
a mass of one of the mass bodies is different from a mass of another one of the mass bodies, the mass bodies being inserted into the mass body containing sections, respectively.

13. A damping material to be attached to a vibration-suppression-target member, the damping material comprising:
   a mass body containing section in which a hollow section is formed for containing a mass body; and
   a gripping section for fixing the damping material to the vibration-suppression-target member by pinching the vibration-suppression-target member,
   the gripping section being provided with a supporting section for elastically supporting the mass body containing section,
   the mass body being inserted into the hollow section, and either one of the supporting section and the mass body containing section being provided with a cut section.

14. The damping material as set forth in claim 13, wherein:
   the cut section is plurally provided.

15. The damping material as set forth in claim 13, wherein:
   the cut section is formed in the supporting section.

* * * * *